(12) United States Patent
Yu et al.

(10) Patent No.: US 6,389,557 B1
(45) Date of Patent: May 14, 2002

(54) FREEZING MECHANISM FOR DEBUGGING

(75) Inventors: Ching Yu, Santa Clara; Din-I Tsai, Fremont; Jeffrey Dwork; Jerry Kuo, both of San Jose, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/154,077

(22) Filed: Sep. 16, 1998

(51) Int. Cl.[7] .................. H02H 3/05; H03K 19/003; H04B 1/74
(52) U.S. Cl. ............... 714/34; 714/25; 714/35; 714/56
(58) Field of Search .................. 714/25, 31, 34–35, 714/56

(56) References Cited

U.S. PATENT DOCUMENTS

| | | | | |
|---|---|---|---|---|
| 4,628,511 A | * | 12/1986 | Stitzlein et al. | 371/22 |
| 4,669,079 A | * | 5/1987 | Blum | 370/85 |
| 4,852,095 A | * | 7/1989 | Meltzer | 371/26 |
| 5,668,983 A | * | 9/1997 | Houle et al. | 395/560 |
| 6,014,752 A | * | 1/2000 | Hao et al. | 713/500 |
| 6,047,321 A | * | 4/2000 | Rabb et al. | 709/224 |
| 6,122,762 A | * | 9/2000 | Kim | 714/726 |

* cited by examiner

Primary Examiner—Peter S. Wong
Assistant Examiner—Tim Vo

(57) ABSTRACT

A system for freezing a communication device in a debug mode has a clock control circuit arranged to produce an internal clock signal in response to an external clock signal. When a stop signal is asserted, the internal clock signal is fixed in its off state. As a result, operations of internal registers supplied with the internal clock signal freeze in a chosen state. A scan test may be performed to examine the internal registers in the chosen state. A bypass clock signal is supplied to control the internal clock signal so as to move the internal registers from one state to another. Thus, an event that causes an error may be recreated.

14 Claims, 4 Drawing Sheets

FREEZING MECHANISM FOR DEBUGGING

FIELD OF THE INVENTION

The present invention relates to data communication, and more particularly, to a system for freezing a data communication device to provide a debugging procedure.

BACKGROUND ART

Subtle errors may degrade performance of a communication device and reduce its efficiency without completely shutting down any portion of the device. Therefore, it would be desirable to provide a communication device having a debug mode that enables a diagnostician to stop or freeze the device in a desired state in order to locate errors.

The causes of errors can lie in many different device components. Also, communications problems can be random and troublesome to reproduce. Therefore, it would be desirable to provide a freezing mechanism that allows a communication device to be monitored in various states so as to recreate an event that may be hard to capture during actual operation of the device.

DISCLOSURE OF THE INVENTION

Accordingly, an advantage of the present invention is in providing a communication device having a debug mode that enables a diagnostician to stop or freeze the device in a desired state in order to locate errors.

Another advantage of the present invention is in providing a freezing mechanism that allows a communication device to be monitored in various states so as to recreate an event that may be hard to capture during actual operation of the device.

These and other advantages of the invention are achieved at least in part by providing a debugging system having an internal clock generating circuit responsive to an external clock signal for producing an internal clock signal supplied to internal circuitry of a data processing device. A freezing circuit supplied with a stop signal fixes the internal clock signal in an off state to freeze operation of the internal circuitry. A bypass circuit supplied with a bypass clock signal controls the internal clock signal in accordance with the bypass clock signal.

The debugging system may comprise a bypass mode control circuit supplied with a bypass mode control signal. The internal clock signal is controlled in accordance with the bypass clock signal when the bypass mode control signal is in a first state. However, the internal clock signal is controlled in accordance with the external clock signal when the bypass mode control signal is in a second state.

In accordance with one aspect of the invention, a system for testing a data processing device may comprise a gate circuit responsive to an external clock signal for producing an internal clock signal supplied to internal circuitry of the device. The gate circuit may also receive a freezing signal produced by a freezing circuit in response to a stop signal to set the internal clock signal into an inactive state.

A multiplexer coupled to the gate circuit and controlled by a bypass mode control signal may allow the internal clock signal to pass to the internal circuitry when the bypass mode control signal is in an inactive state. Also, the multiplexer receives a bypass clock signal allowed to pass to the internal circuitry when the bypass mode control signal is in an active state.

In accordance with a preferred embodiment of the invention, the freezing circuit may comprise a first flip-flop having a data input supplied with the stop signal, and a clock input supplied with the external clock signal. A data input of a second flip-flop may be coupled to an output of the first flip flop. A clock input of the second flip-flop may be supplied with the external clock signal.

The gate circuit may have a first input supplied with the external clock signal, and a second input coupled to an output of the second flip-flop. The multiplexer may have a first input coupled to the output of the gate circuit, and a second input supplied with the bypass clock signal.

In accordance with a method of the present invention, the following steps are carried out for testing a data processing device:

producing an internal clock signal for the device in response to an external clock signal, and supplying a stop signal to set the internal clock signal into an off state to freeze the operation of the device.

A bypass clock signal may be supplied to control the internal clock signal when the operation of the device is frozen.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Although the invention has general applicability in the field of data processing, the best mode for practicing the invention is based in part on the realization of a network interface in a packet switched network, such as an Ethernet (IEEE 802.3) network.

Figure 1A:
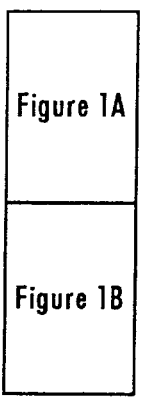
FIG. 1 is a block diagram of an exemplary network interface, in which the present invention may be implemented.
Figure 1A:
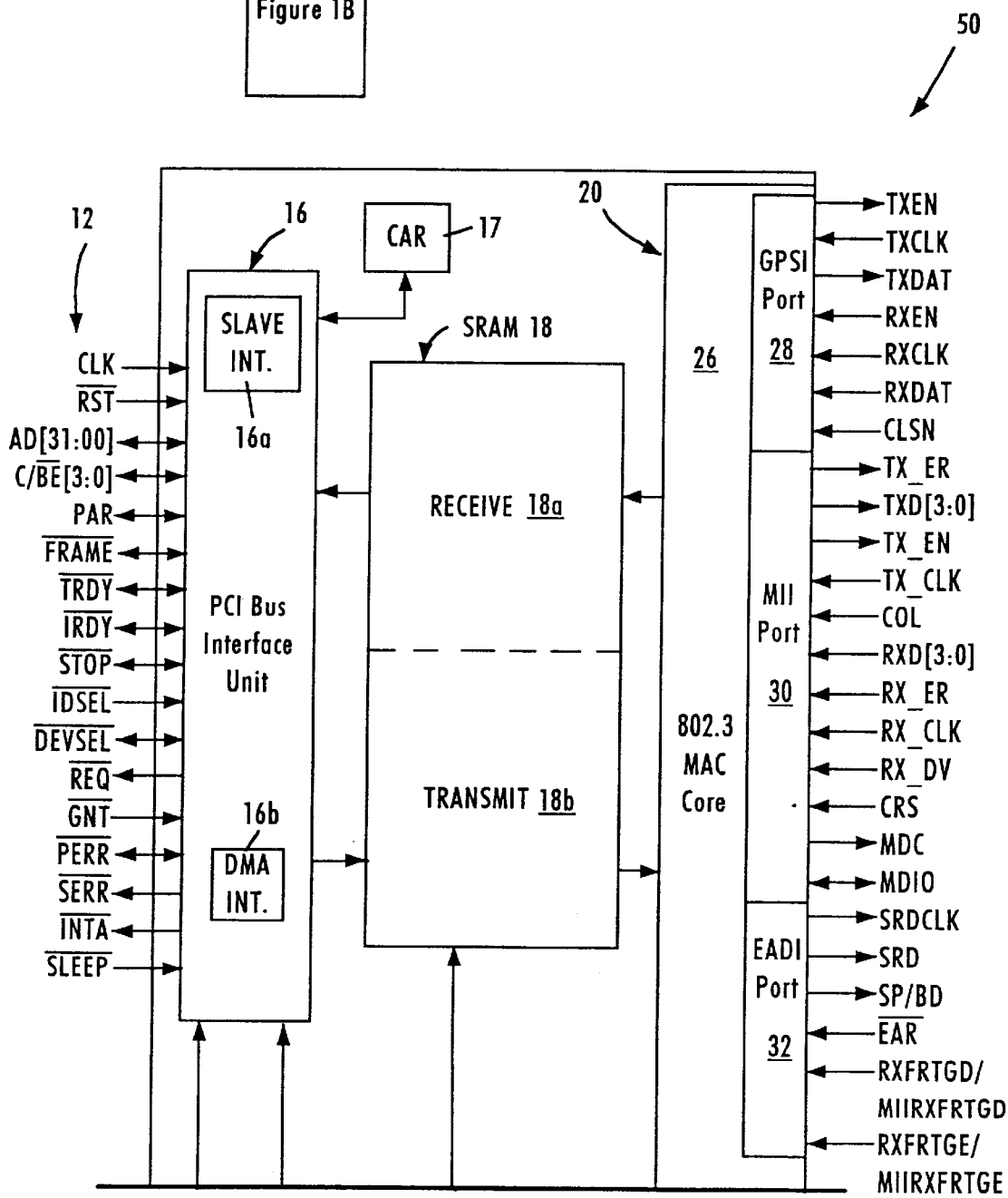
Figure 1B:
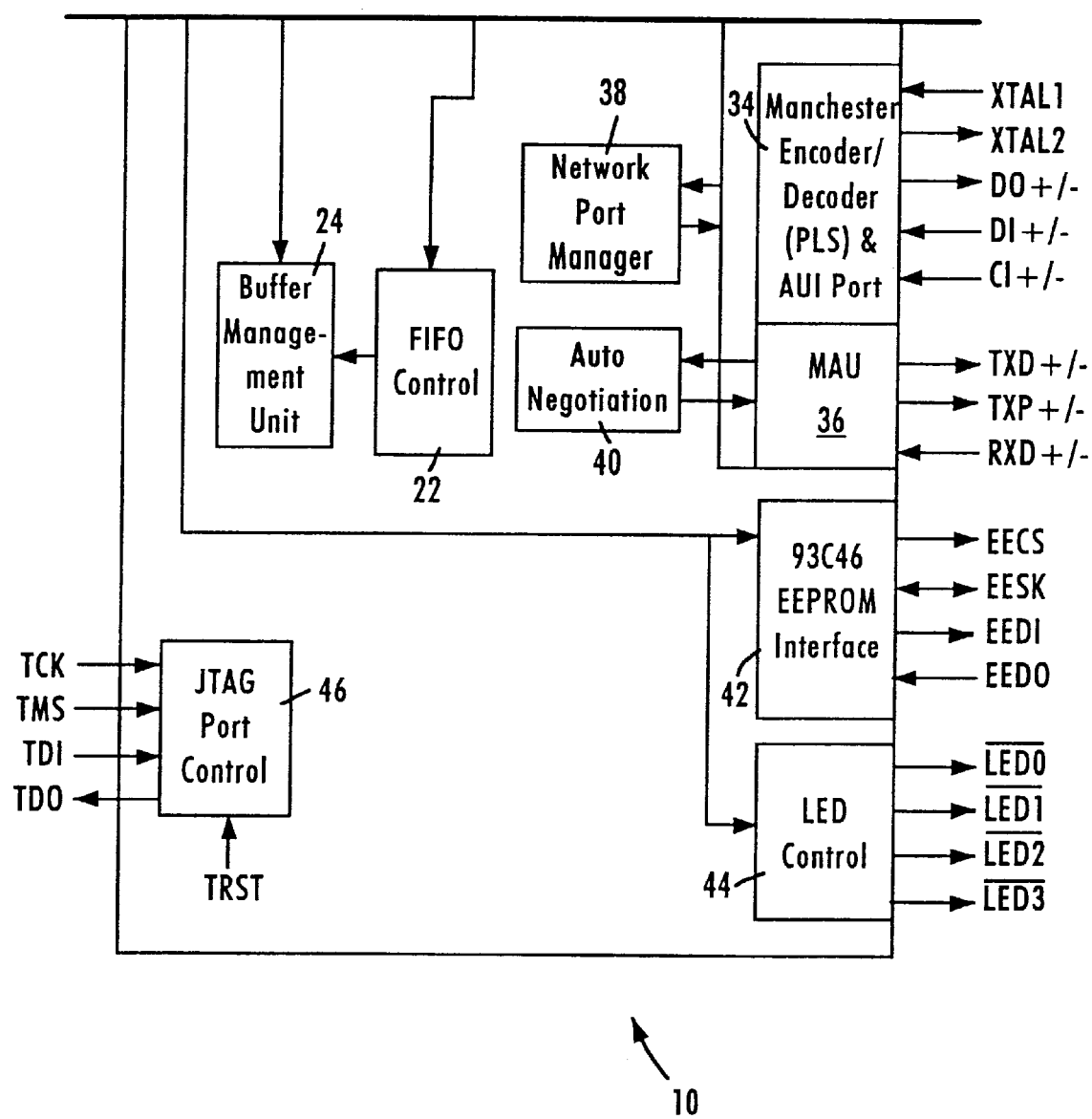

FIG. 1 is a block diagram of an exemplary network interface 10 that accesses the media of an Ethernet (ANSI/IEEE 802.3) network. The network interface 10, preferably, a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface portion 20. The PCI bus interface unit 16 may provide an interface with an external CPU or other host via the PCI local bus. The PCI bus interface unit 16 may include a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

In accordance with the PCI local bus specification, revision 2.1, the PCI bus interface unit 16 has an interrupt request output INTA/ used for supplying the CPU or a host with an interrupt request signal. The network interface 10 produces the interrupt request signal to indicate that one or more of status flags are set. The status flags may represent such events as receive or transmit interrupt, system error, user interrupt, etc.

A control and register (CAR) block 17 is interfaced to the PCI bus interface 16 to allow read and write accesses to various registers in the network interface 10. The CAR block 17 contains a command register which decodes commands and send command signals to other blocks of the interface 10.

The memory portion 18 includes a 16-bit SRAM implemented directly on the network interface chip 10. According to the disclosed embodiment, the SRAM 18 may be accessed in a random access manner under the control of a first in, first out (FIFO) control unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory controller 22 are shown as discrete components, the two units may be integrated to form a memory management unit controlling all transfers of data to and from the memory unit 18.

The network interface portion 20 includes a media access control (MAC) core 26, a general purpose serial interface (GPSI) 28, a media independent interface (MII) 30 for connecting to an external 10 Mb/s or 100 Mb/s physical transceiver (PHY), an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking is performed in accordance with the IEEE 802.3 protocols, and may include link and programming information exchange at the MII layer using a management data clock (MDC), and management data input/output (MDIO) paths defined in the IEEE 802.3 standard.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The EEPROM interface 42 connects to an EEPROM on either a network interface adapter card or the motherboard of the host computer via a serial interface link. The EEPROM (not shown in FIG. 1) may be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down.

The LED controller 44 selectively controls the generation of LED output signals based upon the internal decoding logic and network interface status registers (not shown).

The network interface 10 includes an IEEE 1149.1-compliant JTAG boundary scan test access port interface 46. The interface 46 has a test clock TCK input that provides a controlled clock signal operating at a frequency of up to 10 MHz to support a scan test procedure.

The scan test procedure involves supplying internal registers of the network interface 10 with known input signals and monitoring responses to the known input signals. If an actual response does not match with the expected value, an error is detected.

The scan test interface access port interface 46 may have a test data in (TDI) input for supplying input data. A response value may be measured at a test data out (TDO) output. A test mode select (TMS) input may be used to define the specific boundary scan test to be executed. A test reset input TRST may provide a reset signal during test operations. The TCK input, TDI input, TDO output, TMS input and TRST input may operate in the same signaling environment as the PCI bus interface 16.

For example, an external logic analyzer (not shown) may be coupled to the scan test access port interface 46 to provide clock and control signals, and input data required to perform the specific scan test. The logic analyzer may receive output signals from the TDO output to compare test output data with expected values, in order to detect errors.

To locate malfunctions caused by various internal registers and state machines, the network interface 10 may be tested in a debug mode used to investigate functional operation of the interface 10. In the debug mode, the network interface 10 may be stopped in any chosen state. A scan test is performed in the chosen state of the interface 10 to examine internal registers and state machines. For example, a logic analyzer connected to the scan test access port interface 46 may supply known input signals for scanning out the contents of the internal registers and state machines.

Figure 2:
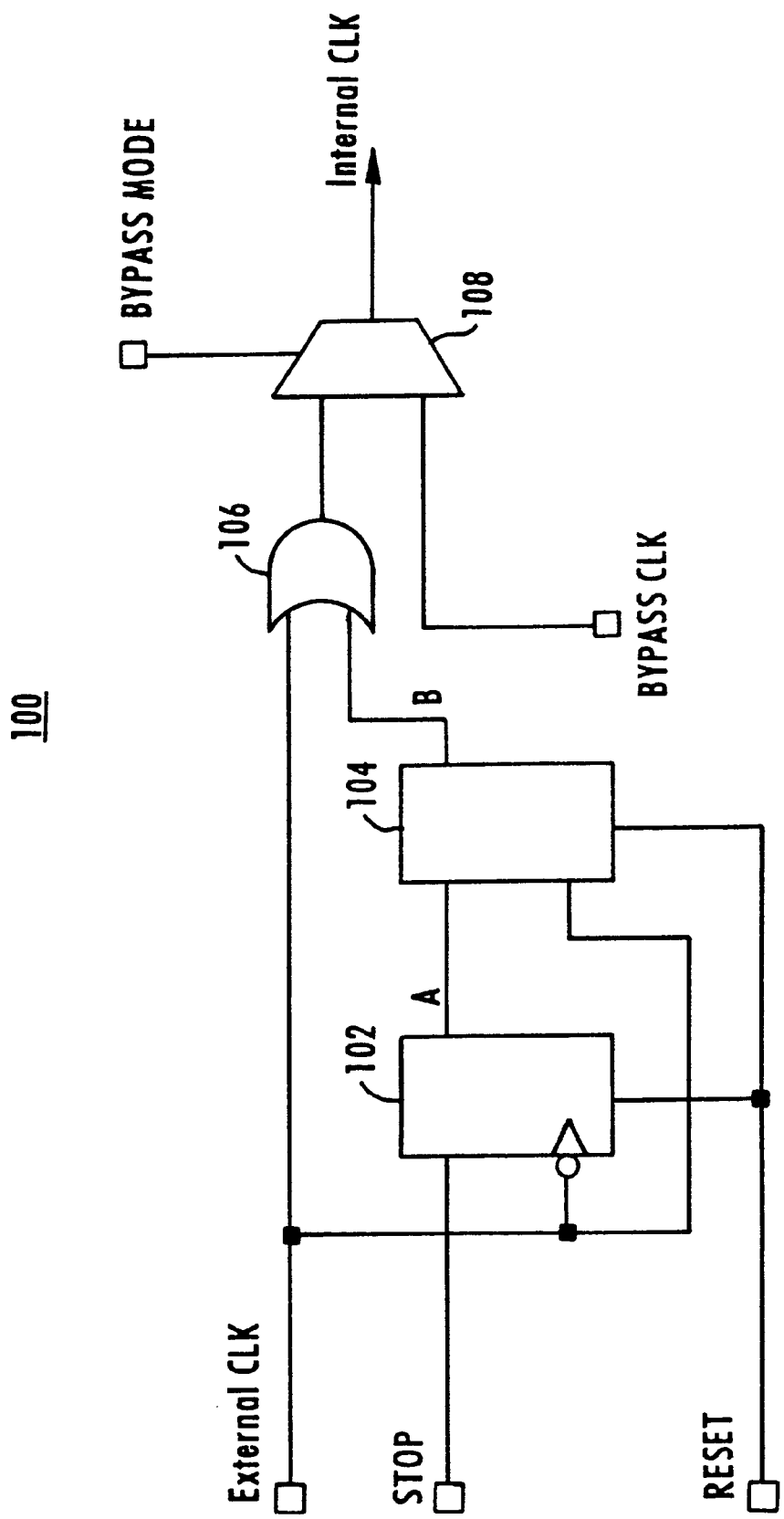
FIG. 2 is a block diagram of a clock control circuit of the present invention.

FIG. 2 illustrates a clock control circuit 100 that generates an internal clock (CLK) signal supplied to internal circuits and registers of the network interface 10. For example, the clock control circuit may be arranged in the scan test access port interface 46.

The clock control circuit 100 enables a user to freeze the internal registers of the network interface 10 in any chosen state. As a result, the internal registers can be examined to locate an error or malfunction.

The clock control circuit 100 comprises flip-flops 102 and 104, an OR gate 106 and a multiplexer 108. A stop signal is supplied to a data input of the flip-flop 102. The stop signal may be generated by the external logic analyzer and supplied via a dedicated stop pin provided on the network interface chip. An output of the flip-flop 102 is coupled to a data input of the flip-flop 104.

Clock inputs of the flip-flops 102 and 104 are supplied with an external clock signal. For example, the external clock signal may be a PCI clock input CLK provided via the PCI bus interface 16.

Reset inputs of the flip-flops 102 and 104 may be provided with an external reset signal. For example, the reset signal may be supplied from the external logic analyzer via the TRST input.

The output of the flip-flop 104 is connected to a first input of the OR gate 106 having a second input supplied with the external clock signal. The output of the OR gate 106 is coupled to a first input of the multiplexer 108.

A clock signal BYPASS CLK is supplied to a second input of the multiplexer 108 to control the internal clock signal in a debug mode. The BYPASS CLK signal may be supplied from the external logic analyzer. A control input of the multiplexer 108 is provided with a mode control signal BYPASS MODE which may be supplied from the external logic analyzer to switch the network interface 10 into the debug mode.

Figure 3:
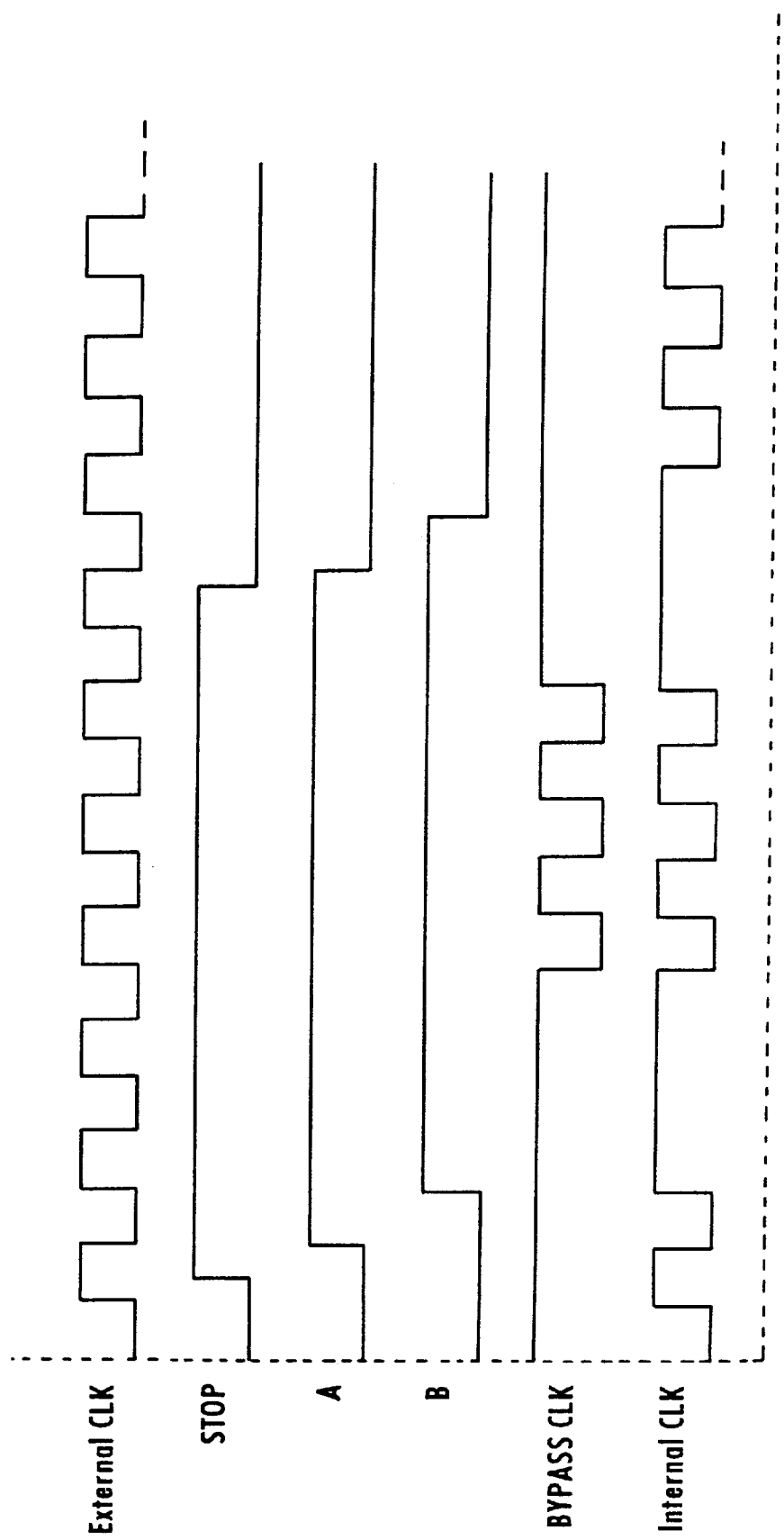
FIG. 3 illustrates signals in the clock control circuit.

The operation of the clock control circuit 100 is described below with reference to FIG. 3 illustrating signals in the debug mode. When the network interface 10 is in a normal mode of operation, the BYPASS MODE signal may be set to logic 0, the BYPASS CLK signal is in its off state corresponding to logic 1, and the STOP signal is at a logic 0 level.

In the normal mode, the external clock signal passes to the output of the OR gate 106. The inactive state of the BYPASS MODE signal at the control input of the multiplexer 108 allows the external clock signal to pass to the output of the multiplexer 108. Thus, the internal clock signal is defined by the external clock signal.

When the STOP signal goes high, the flip-flop 102 produces an output signal A delayed by a half-cycle of the external clock signal with respect to the STOP signal. The flip-flop 104 produces an output signal B delayed by a cycle of the external clock signal with respect to the STOP signal.

As soon as the signal B goes high, logic 1 is produced at the output of the OR gate 106 to fix the internal clock signal at a high level. This results in freezing operations of the internal registers supplied with the internal clock signal. Thus, it takes one external clock cycle to set the internal clock in its off state after the STOP signal is asserted.

When the internal clock stops, the BYPASS MODE signal is asserted to provide debugging of the network interface 10. A scan test may be performed using the external logic analyzer connected to the scan test access port interface 46. The TDI input may be used for writing predetermined data into selected internal registers. Responses may be monitored via the TDO output.

When the BYPASS MODE is set to logic 1, the muliplexer 108 allows the BYPASS CLK signal to pass to its output. As a result, the internal clock signal is defined by the BYPASS CLK signal.

The BYPASS CLK signal may be produced so as to control the internal clock signal in any required manner. For example, the internal clock signal may be controlled to sequentially transfer internal registers from one state to another, in order to recreate an event that causes an error.

A separate clock control circuit 100 may be provided for each derived clock signal used in a device to be debugged. In this case, it can be guaranteed that each derived clock will stop in its off state. A separate output pin performing the AND function of all the derived clocks may be used to indicate that all clocks are in their off states.

There accordingly has been described a system for freezing a communications device in a debug mode. A clock control circuit is arranged to produce an internal clock signal in response to an external clock signal. When a stop signal is asserted, the internal clock signal is fixed in its off state. As a result, operations of internal registers supplied with the internal clock signal freeze in a chosen state. A scan test may be performed to examine the internal registers in the chosen state. A bypass clock signal is supplied to control the internal clock signal so as to move the internal registers from one state to another. Thus, an event that causes an error may be recreated.

In this disclosure, there are shown and described only the preferred embodiments of the invention, but it is to be understood that the invention is capable of changes and modifications within the scope of the inventive concept as expressed herein.

What is claimed is:

1. A system for debugging a data processing device, comprising:

an internal clock generating circuit responsive to an external clock signal for producing an internal clock signal supplied to internal circuitry of said data processing device, a freezing circuit responsive to a stop signal for fixing said internal clock signal in an off state to freeze operation of said internal circuitry, a bypass circuit responsive to a bypass clock signal supplied from a logic device external with respect to said data processing device for controlling said internal clock signal in accordance with said bypass clock signal in a debug mode, and a bypass mode control circuit responsive to a bypass mode control signal supplied from said external logic device, wherein said internal clock signal is controlled in accordance with said bypass clock signal when said bypass mode control signal is in a first state to enable operation in the debug mode, and said internal clock signal is controlled in accordance with said external clock signal when said bypass mode control signal is in a second state.

2. The system of claim 1, further comprising a multiplexer coupled to the internal clock generating signal and controlled by the bypass mode control signal for allowing the external clock signal to pass to the internal circuitry when the bypass mode control signal is in the second state.

3. The system of claim 2, wherein said multiplexer is arranged to receive said bypass clock signal.

4. The system of claim 3, wherein said multiplexer allows said bypass clock signal to pass to said internal circuitry when said bypass mode control signal is in the first state.

5. A system for testing a data processing device, comprising:

a gate circuit responsive to an external clock signal for producing an internal clock signal supplied to internal circuitry of said data processing device, a freezing circuit responsive to a stop signal for producing a freezing signal supplied to said gate circuit to set said internal clock signal into an inactive state, and a multiplexer responsive to a bypass clock signal supplied from a testing device external with respect to said data processing device and to said external clock signal, and controlled by a bypass mode control signal supplied from said external testing device for allowing said external clock signal to pass to said internal circuitry when said bypass mode control signal is in an inactive state, and for allowing said bypass clock signal to pass to said internal circuitry when said bypass mode control circuit is in an active state.

6. The system of claim 5, wherein said freezing circuit comprises a first flip-flop having a data input supplied with said stop signal.

7. The system of claim 6, wherein said first flip-flop has a clock input supplied with said external clock signal.

8. The system of claim 7, wherein said freezing circuit further comprises a second flip-flop having a data input coupled to an output of said first flip flop, and a clock input supplied with said external clock signal.

9. The system of claim 8, wherein said gate circuit has a first input supplied with said external clock signal, and a second input coupled to an output of said second flip-flop.

10. The system of claim 9, wherein said multiplexer has a first input coupled to an output of said gate circuit, and a second input supplied with said bypass clock signal.

11. A method of testing a data processing device, comprising the steps of:

producing an internal clock signal for said data processing device in response to an external clock signal, supplying a stop signal to set said internal clock signal into an off state to freeze operation of said data processing device, supplying a bypass clock signal from an external testing device to control said internal clock signal when operation of said data processing device is frozen, and controlling a multiplexer by a bypass mode control signal supplied from said external testing device for allowing the bypass clock signal to pass to internal circuitry of said data processing device when the bypass mode control signal is in a first mode, and for allowing the external clock signal to pass the internal circuitry when the bypass mode control signal is in a second mode.

12. A data communication device comprising:

multiple internal registers, and a scan test access port interface for performing a scan test on the internal registers, said scan test access port interface including:

an internal clock generating circuit responsive to an external clock signal for producing an internal clock signal supplied to the internal registers, a freezing circuit responsive to a stop signal for fixing said internal clock signal in an off state to freeze the internal registers in a chosen state, and a bypass circuit controlled by a bypass mode signal and responsive to a bypass clock signal for controlling said internal clock signal in accordance with said bypass clock signal in a debug mode.

13. The device of claim 12, wherein the bypass clock signal is supplied to the internal registers when the bypass mode signal is in an active state.

14. The device of claim 13, wherein the external clock signal is supplied to the internal registers when the bypass mode signal is in an inactive state.

* * * * *